(12) United States Patent
Leys et al.

(10) Patent No.: US 6,973,705 B2
(45) Date of Patent: Dec. 13, 2005

(54) FLUOROPOLYMER FLOWMETER

(75) Inventors: John A. Leys, Eden Prairie, MN (US); Steven P. Kolbow, Chaska, MN (US); Steven A. Fischer, Savage, MN (US); Carlos Cadavid, Chanhassen, MN (US); Todd M. Ulschmid, New Prague, MN (US)

(73) Assignee: Entegris, Inc., Chaska, MN (US)

( * ) Notice: Subject to any disclaimer, the term of this patent is extended or adjusted under 35 U.S.C. 154(b) by 42 days.

(21) Appl. No.: 10/884,620

(22) Filed: Jul. 2, 2004

(65) Prior Publication Data

US 2005/0022610 A1    Feb. 3, 2005

Related U.S. Application Data

(62) Division of application No. 10/156,449, filed on May 28, 2002, now Pat. No. 6,758,104.

(60) Provisional application No. 60/293,672, filed on May 25, 2001, provisional application No. 60/364,774, filed on Mar. 15, 2002.

(51) Int. Cl.[7] .............................................. G01R 4/00
(52) U.S. Cl. ..................................... 29/593; 73/861.57
(58) Field of Search .................... 73/861.57, 861.55, 73/861.56, 861.58; 29/593

(56) References Cited

U.S. PATENT DOCUMENTS

| | | | |
|---|---|---|---|
| 3,633,421 A | 1/1972 | Phillips | |
| 3,675,481 A | 7/1972 | Phillips | |
| 3,842,671 A | 10/1974 | Frizelle | |
| 3,915,552 A | 10/1975 | Rickert | |
| 4,312,240 A | 1/1982 | Hermanns | |
| 4,317,376 A | 3/1982 | Fitzpatrick | |
| 4,559,834 A | 12/1985 | Phillips et al. | |
| 4,678,278 A | 7/1987 | Friesen et al. | |
| 4,699,617 A | 10/1987 | Moriuchi et al. | |
| 4,836,689 A | 6/1989 | O'Brien et al. | |
| 4,929,293 A | 5/1990 | Osgar | |
| 5,078,004 A | 1/1992 | Nyseth | |
| 5,381,826 A | 1/1995 | Franz | |
| 5,549,277 A | 8/1996 | Franz | |
| 5,565,631 A | 10/1996 | Neher | |
| 5,655,658 A | 8/1997 | Saveliev et al. | |
| 5,672,832 A | 9/1997 | Cucci et al. | |
| 6,212,957 B1 | 4/2001 | McCombs et al. | |
| 6,758,104 B2 * | 7/2004 | Leys et al. | ............... 73/861.57 |

* cited by examiner

Primary Examiner—Max Noori
Assistant Examiner—Jewel V. Thompson
(74) Attorney, Agent, or Firm—Patterson, Thuente, Skaar & Christensen, P.A.

(57) ABSTRACT

In one embodiment, a sight tube flowmeter is formed of a plurality of fluoropolymer components welded together to form a unitary flowmeter body. The components can comprise a PFA upright sight tube having two end portions, a flow conduit extending therethrough and two fitting portions that are uniquely welded onto each end of the sight tube, and a fluoropolymer float device movable to various positions within the flow conduit depending on the flow level of the fluid flowing therethrough. The float device can be of conventional design or for those flowmeter embodiments where low fluid flow rates are to be measured, an elongate float can be utilized. The floats and, in particular, a designated portion thereof, are visible through the sight tube to provide visual indication of the position, and thus the flow rate of fluid flowing through the flowmeter. In addition, alternative embodiments include the implementation of the unique sight tube and elongate float design in conventional flowmeters.

3 Claims, 9 Drawing Sheets

FLUOROPOLYMER FLOWMETER

RELATED APPLICATIONS

This is a divisional of U.S. patent application filed May 28, 2002, entitled "Fluoropolymer Flowmeter" and assigned Ser. No. 10/156,449, which in turn claims the benefit of the contents and filing date of U.S. Provisional Patent Application filed May 25, 2001, entitled "Injection Molded and Welded Fluoropolymer Flow Meters" and assigned Ser. No. 60/293,672, and Provisional Patent Application filed Mar. 15, 2002, entitled "Low Flow Rate Fluoropolymer Flowmeter" and assigned Ser. No. 60/364,774, with all of said applications being incorporated herein by reference.

FIELD OF THE INVENTION

This invention relates generally to fluid flowmeters, and more particularly, to a substantially unitary-bodied fluoropolymer flowmeter capable of employing various component and float configurations.

BACKGROUND OF THE INVENTION

Flowmeters are utilized in many different industries to measure and control the flow of various fluids. Flowmeters generally utilize moveable float members in the fluid flow stream for the measurement of pressure drops across an orifice in the fluid flow stream. These flowmeters generally have electrical circuits and readouts that provide highly accurate measurements of flow rates. Due to their complexity, reliability and maintenance are issues, as is cost. A mechanically simple and highly reliable flowmeter utilizes an upright tube that allows for visual gauging of volumetric flow rates through the monitoring of marked indicia on the sight flow tube itself, or other connection means. The sight tube will have a pair of fittings at each end of the sight tube for connection to and insertion into a fluid flow circuit. A "float" is denser than the fluid being measured, is visible through the sight tube, and rises up the tube as the flow rate increases. The flow rate is visually indicated by the position of the float in the sight tube. Typical floats are generally shaped as balls, spherical objects, and other non-elongate members designed to move freely in the sight tube or to be guided along a guide rod securely mounted within the sight tube. Such conventional float designs generally function sufficiently in measuring medium to high fluid flow rates through a flowmeter. However, in certain industries, such as semi-conductor processing, low and ultra-low fluid flow rates are often required during processing. The measurement of these reduced flow rates through a fluid flowmeter must be accurately indicated to ensure processing efficiency and precision.

Figure 1:
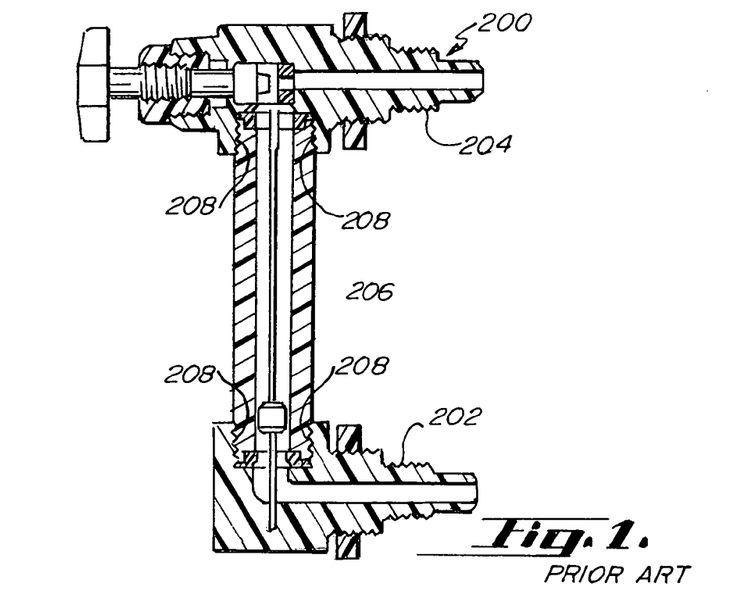
FIG. 1 is a view of a prior art flowmeter.
Figures 1, 2:
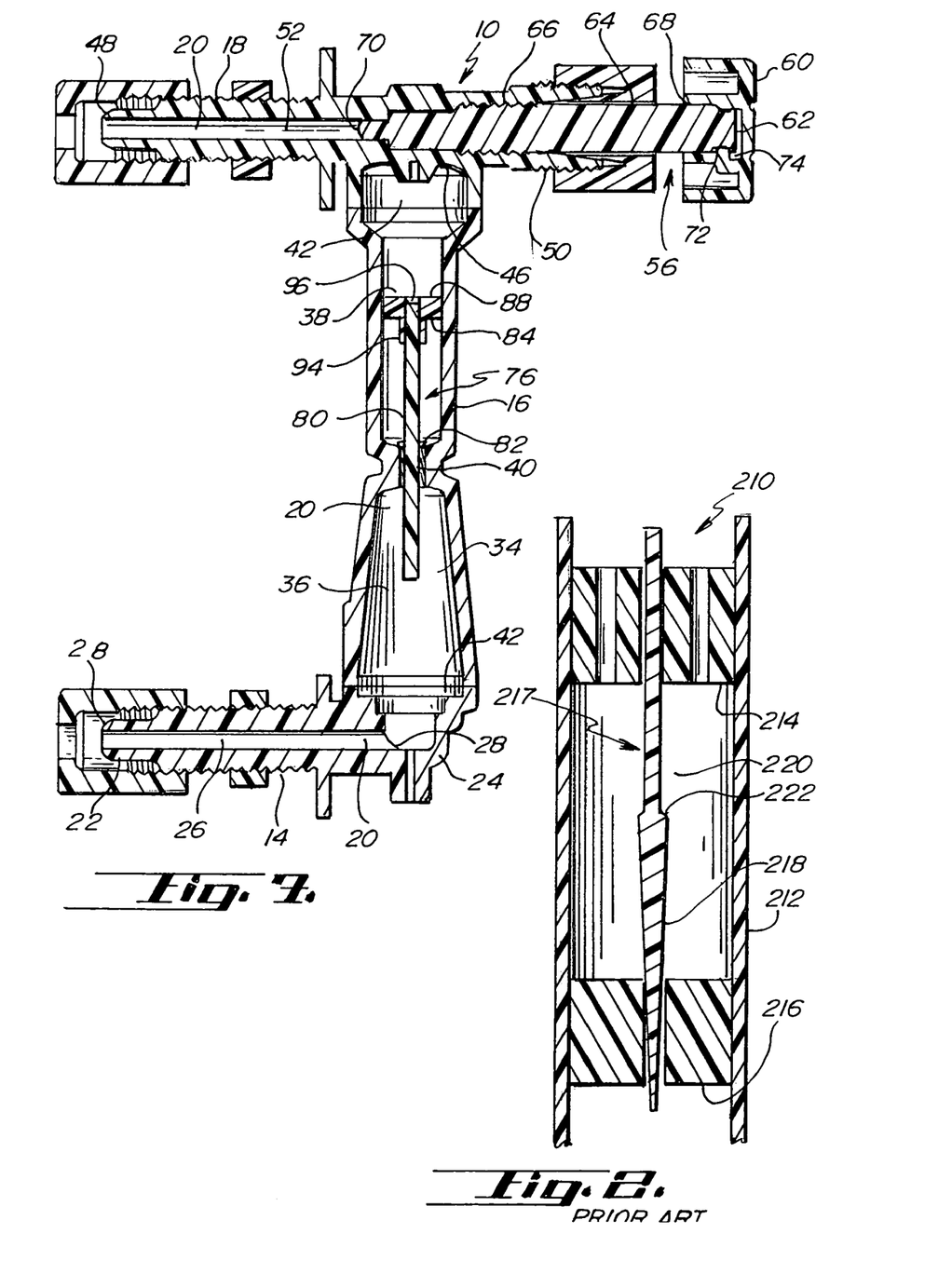
FIG. 2 is cross-sectional view of a prior art float assembly employed in a prior art flowmeter.

Even known float assemblies in the industry having a generally elongate float, which are designed to meter low fluid flow rates, are deficient. Referring to FIG. 2 in particular, a prior art flowmeter 210 having a tapered elongate float 217 and sight tube 212 system is utilized wherein the float 217 is guided through guides 214, 216. This system is intended to meter low fluid flow rates. The float 217 comprises a tapered section 218 that ends approximately central to the float 217 at a ledge 222. Lateral float movement is controlled with the use of bottom guides 216 and top guides 214. The taper of the float 217 increases from one end proximate the guides 216 to the ledge 222. As the float 217 is forceably moved upward with fluid pressure through the sight tube 212, it progresses upward until the ledge 222 engages the top guides 214. With a reduction in fluid flow, the float 217 returns downward until being stopped by the tapering effect of the tapered section 218. Such a system has an innate drawback in that stopping of the float 217 with the tapered section 218 within the bore or channel of guides 216 can cause an undesirable wedging effect. This innate characteristic is particularly unacceptable when measuring low flow rates. Namely, the tapered section 218 can become measurably stuck within the guides 216 such that a higher level of flow is required to initiate forceable movement of the float 217 within the tube 212. Since low flow rates are the focus of such a flowmeter, this can serve to decrease reliability and accuracy, especially for the periods of fluid flow prior to dislodging of the wedged float 217. In fact, this may completely prevent fluid flow metering for ultra-low fluid flows through the flowmeter 210.

In the processing of semi-conductor wafers into integrated circuits, highly corrosive, ultra-pure fluids, such as hydrochloric, sulfuric and hydrofluoric acid, are in extreme temperature ranges and are utilized. These fluids not only damage traditional flowmeter materials, but they additionally impose significant health risks for personnel exposed to the fluids during the manufacturing process. Moreover, the equipment and materials in contact with these ultra-pure fluids must not contaminate or add impurities to the fluids.

Thus, semi-conductor processing applications require flowmeter construction providing accurate fluid flow measurements at varying fluid flow rates, while at the same time utilizing highly inert materials that withstand the potential damaging effects of these corrosive fluids, that do not contaminate the fluids, and that tolerate the broad temperature ranges. Moreover, the design of such flowmeters must minimize fluid leakage pathways.

Prior art flowmeters have addressed the problems associated with the use of corrosive fluids in flowmeters by using highly inert corrosive-resistant plastics in the construction of components of the flowmeters. Fluoropolymers such as perfluoroalkoxy resins (PFA), polytetrafluoroethylenes (PTFE), and ethylenetetrafluoroethylenes (ETFE) are plastics that are suitable for use with these corrosive fluids. The translucent-transparency characteristics of thin-walled PFA is typically utilized in the construction of the sight tube of these flowmeters.

U.S. Pat. No. 5,672,832 (the '832 patent) is an example of a flowmeter device where fluoropolymers are utilized. This specific device discloses a fluoropolymer housing flowmeter that places two cavities in the flow tube region where pressure sensors are placed for accurately measuring fluid flow rates. The rectangular housing and cover for this invention are constructed of non-translucent PTFE and the cover is mounted to the housing with screws, with a gasket positioned in between the two in an attempt to minimize fluid leakage.

U.S. Pat. Nos. 5,078,004, 5,381,826, and 5,549,277 are examples of fluoropolymer flowmeters utilizing sight tubes where a limited portion of the flowmeter is made of PFA material. In such flowmeters, the centrally located sight tube can be machined from PFA, with additional fitting components machined from PTFE, or other non-translucent materials, which are connected directly to the ends of the sight tube, or connected in series with those parts that do have a direct association with the PFA sight tube. Generally, each of these components are attached to each other and/or the sight tube via threaded portions.

These currently available fluoropolymer flowmeter devices, whether they be conventional sight tube flowmeters or other flowmeters, contain disadvantages centering mainly around the materials used and the methods of assembly.

Generally fluoropolymers, particularly PTFE, are not conducive to injection molding processes. As a result, in the known commercial sight tube fluoropolymer flowmeters, such as the device shown in FIG. 1, each component is machined to obtain the desired shapes, tolerances, and the requisite threaded connections. Machining adds very significant labor costs to the production of the devices and, to the extent possible, should be avoided. Moreover, multi-component flowmeter assemblies utilizing threaded portions present potential fluid leakage pathways. The possibility of fluid leakage is increased with each non-unitary connection between components. For instance, in FIG. 1, the flowmeter 200 includes at least a first fitting 202, and a second fitting 204 that are threadably attached, at threaded portions 208, to the tapered sight tube 206, thus increasing the potential for unacceptable leakage. Further, the sight tube 206 is likely constructed of translucent PFA, while the fittings 202, 204 are constructed of a material such as PTFE.

Ideally, flowmeters, particularly those utilized in handling corrosive-caustic fluids, should have a minimum number of non-unitary connections that do utilize the process of threadingly joining molded flowmeter components, namely the fittings to the sight tube.

The manufacturing process for the so-called unitary-bodied flowmeters constructed of conventional plastics generally involves the affixation of a plug or cap to a body portion. The affixation processes known for these conventional plastic sight tube flowmeters involve adhesive bonding and ultrasonic welding. Ultrasonic welding involves vibrating or oscillating a first plastic component with respect to a second plastic component that it is in engagement with the first plastic component. Such welding is not effective for joining tubular end portions. Moreover, due to the "slippery" nature of fluoropolymers, forms of vibrating or oscillating bonding is not realistic. Similarly, adhesives do not work on fluoropolymers, and would only add potential contaminants which must be avoided in semi-conductor processing applications.

Although PFA is substantially more expensive then PTFE (perhaps 10–15 times as expensive) it is considered to have great advantages over PTFE. Namely, PFA is cleaner, providing less contaminants than PTFE. Further, and unlike PTFE, PFA can be injection molded and homogeneously joined with like materials.

Homogeneously joining by welding separate fluoropolymers components, such as PTFE, is essentially impossible. In comparison, PFA components may be welded together utilizing non-contact heating as disclosed in U.S. Pat. No. 4,929,293, assigned to Fluoroware, Inc., also the owner of the instant application. It is believed that these welding techniques have never, before this invention, been utilized in association with the manufacture of a fluoropolymer flowmeter.

All of the discussed prior art falls short of adequately addressing the unique accuracy, purity, and low fluid flow needs of the semi-conductor processing industry. The prior art does not address the need for coupling the benefits PFA offers in resisting corrosion with the advantages a unitary-bodied component construction advances with regard to leakage prevention and reduced manufacturing and assembly costs.

SUMMARY OF THE INVENTION

The embodiments of the flowmeter of the present invention substantially solve the problems innately present with conventional fluid flowmeters. These needs are addressed by introducing a corrosive-resistant flowmeter made of a material such as PFA where reliability and effectiveness are increased while manufacturing costs can be reduced in one embodiment by utilizing a unitary-bodied component construction. Further, the a functional component design that enables accurate and efficient readings and indications of reduced fluid flow rates.

In one embodiment, a sight tube flowmeter is formed of a plurality of fluoropolymer components welded together to form a unitary flowmeter body. The components can comprise a PFA upright sight tube having two end portions, a flow conduit extending therethrough and two fitting portions that are uniquely welded onto each end of the sight tube, and a fluoropolymer float device movable to various positions within the flow conduit depending on the flow level of the fluid flowing therethrough. The float device can be of conventional design or for those flowmeter embodiments where low fluid flow rates are to be measured, an elongate float can be utilized. The floats and, in particular, a designated portion thereof, are visible through the sight tube to provide visual indication of the position, and thus the flow rate of fluid flowing through the flowmeter. In addition, alternative embodiments include the implementation of the unique sight tube and elongate float design in conventional flowmeters not having a unitary-bodied configuration.

At least one of the fittings may include a valve assembly to control the flow rate of the fluid. The invention also includes the process of manufacturing the flowmeter, in particular the steps of injection molding PFA components and welding the PFA components to form a unitary flowmeter body. In one embodiment of the process the components are welded using a noncontact heater to melt the PFA portions to be welded, wherein the portions are then brought into contact with each other and held until the PFA cools and solidifies. A curing step involving baking at least one of the PFA flowmeter components on a jig, may also be added.

A feature and advantage of an embodiment of the invention is that the entire flowmeter body can be of a unitary construction. Threaded connections between the sight tube and the sight tube end connections are eliminated. This minimizes potential leakage pathways, lessens potential hazards to personnel, and lowers manufacturing costs.

A further feature and advantage of an embodiment of the invention is that machining of component parts of the flowmeter is substantially, or even entirely, eliminated. This, in turn, can lower labor and manufacturing costs, and the end cost of the flowmeter.

Yet another feature and advantage of an embodiment of the invention is that the body is manufactured entirely of PFA which is cleaner and exposes the metering process to less contamination. This is essential in the semiconductor processing field.

Still another feature and advantage of an embodiment of the invention is that the entire body can be measurably translucent. Translucent characteristics provide for increased visibility of the component positions such as a valve member and float, and provide increased visibility of any contaminants that may be present within any portion of the flowmeter.

A further feature and advantage of an embodiment of the invention is that it can be an injection molded flowmeter that is inert and chemically resistant to the chemicals utilized in semiconductor wafer processing.

Yet another feature and advantage of an embodiment of the invention is that the design of the elongate float coupled with the shape and construction of the conduit within the sight tube cam permit an increase in metering accuracy for low and ultra-low fluid flow rates through the flowmeter.

Another feature and advantage of an embodiment of the invention is that the sight tube and elongate float design of the present invention can be implemented in those conventional flowmeters that are not unitary-bodied to increase measurement of low and ultra-low fluid flow rates.

Still another feature and advantage of an embodiment of the invention is that the welding of multiple components or parts together to form a unitary-bodied flowmeter can increase the possibilities and efficiencies of adjusting and modifying the structural configuration of the three main weldable components of the flowmeter. Modifications can be efficiently focused on only those components where it is needed such that molding and manufacturing processes for the entire flowmeter are not unnecessarily disrupted or altered. For instance, design and functional changes can be narrowly directed to the sight tube and float assembly if desired.

BRIEF DESCRIPTION OF THE DRAWINGS

FIG. 7 is a cross-sectional view of one embodiment of a unitary-bodied fluoropolymer flowmeter in accordance with the present invention;

DETAILED DESCRIPTION OF THE PREFERRED EMBODIMENT

Figure 3:
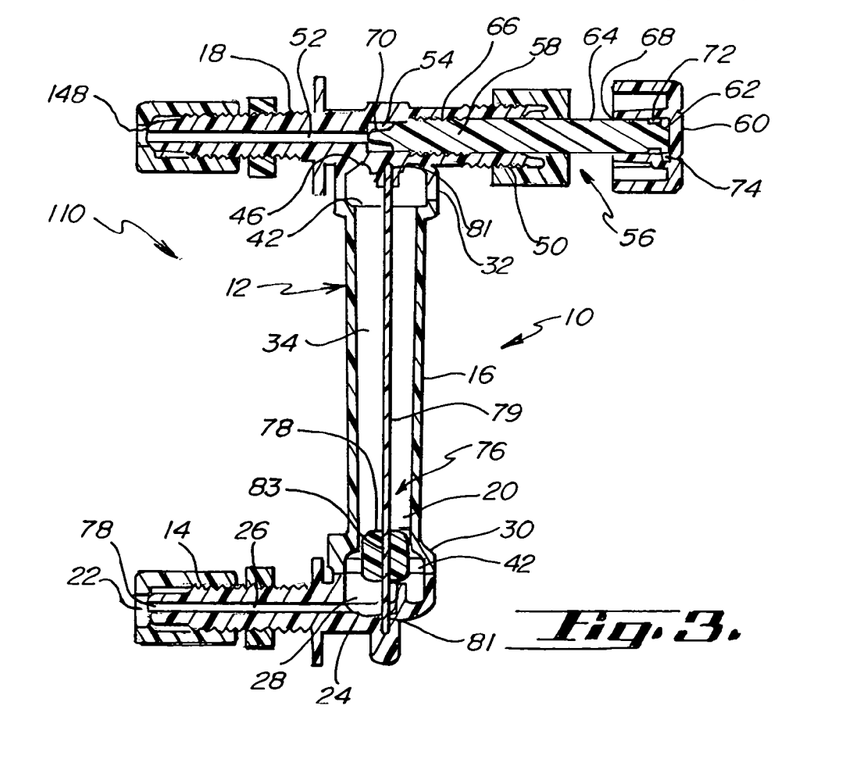
FIG. 3 is a cross-sectional view of one embodiment of a unitary-bodied fluoropolymer flowmeter in accordance with the present invention.

FIG. 3 shows one embodiment of a unitary-bodied flowmeter 12 in accordance with the present invention. The flowmeter can be a welded assembly of injection molded fluoropolymer plastic components, generally PFA components or fluoropolymers having translucent qualities, wherein at least two of the three main body components are joined through a compactable welding process. Other fluoropolymer plastics are also envisioned for component and part use in the flowmeters in accordance with the present invention. For example, but not for limiting purposes, PTFE, ETFE, and other plastics are envisioned. The translucent characteristics of the preferred fluoropolymers can vary in the degree to which it is translucent, such that translucent characteristics permit gauging of a float device within the sight tube, as will be discussed in detail herein.

Referring to FIGS. 3–10, flowmeter 10 generally comprises the joining of at least two of three main body components into a unitary flowmeter body 12. Unitary-bodied can mean the joining two of the three main body components to the third component through a weldment bond (discussed herein) such that two of components are initially molded as one piece. For instance, one molded piece could comprise of the second fitting 18 and sight tube 16, with the first fitting 14 being later welded or otherwise joined with the available end of the sight tube 16. It is preferred that at least one of the three main body components is constructed of a translucent fluoropolymer for preferred embodiments.

The three main body components are first fitting 14, sight tube 16, and second fitting 18. Once each component is positionally joined to properly form the unitary flowmeter body 12, as will be explained in detail below, body conduit 20 is formed which provides a flow channel beginning with and running through first fitting 14, continuing through sight tube 16, and running through and out of the end of second fitting 18.

First fitting 14 generally comprises an entering end 22 and an exiting end 24. In one embodiment, these ends 22, 24 are generally in a perpendicular relationship to each other. A first fitting conduit 26 defines an inner bore of some diameter within first fitting 14, traveling along the longitudinal axis of first fitting 14 for the entire distance beginning with entering end 22 and ending with exiting end 24. First fitting conduit 26 results in first fitting openings 28 at each end 22, 24 of first fitting 14. Known fittings, connectors, and other devices known to one skilled in the art for connecting to sight tubes and other components of flowmeters are envisioned for first fitting 14.

Figure 4:
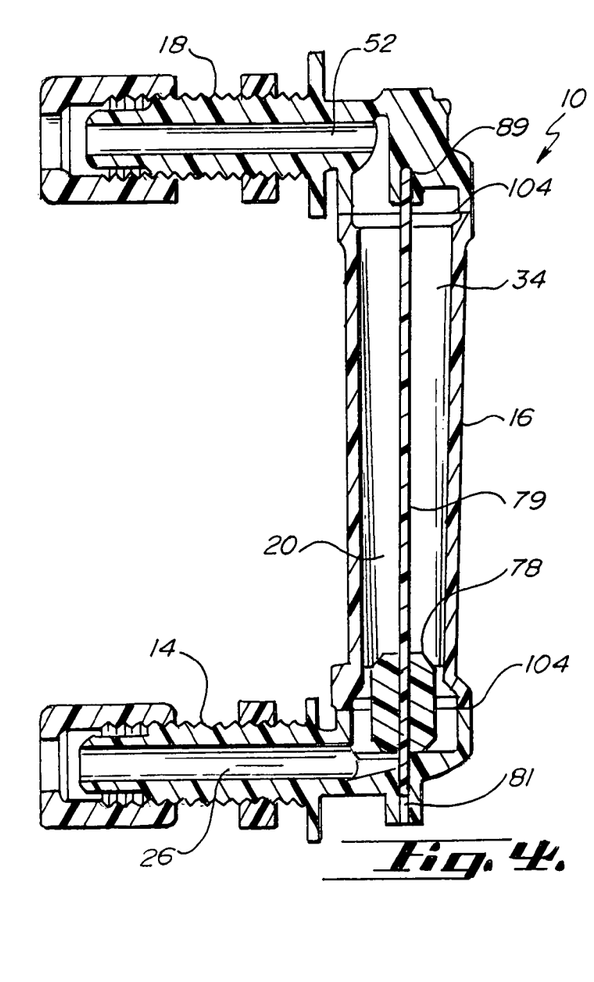
FIG. 4 is a cross-sectional view of one embodiment of a valveless unitary-bodied fluoropolymer flowmeter in accordance with the present invention.

In one embodiment, as shown in FIGS. 3–4, sight tube 16 comprises a generally cylindrical tube with first fitting end 30 and second fitting end 32. The sight tube 16 has a tube conduit 34 running through it so that an inner bore of some diameter generally larger than the inner diameters of first fitting conduit 26 and second fitting conduit 52 is defined. Tube conduit 34 traverses the longitudinal axis of sight tube 16 for the entire distance of sight tube 16 so that sight tube openings 42 are formed at each of the ends 30, 32. The diameter of tube conduit 34 can gradually taper the distance of the tube conduit 34. It is preferred that the diameter at second fitting end 32 is larger than the diameter at first fitting end 30. While preferred embodiments are generally cylindrical with visual gauging characteristics, other shapes and constructions for the tube 16 are envisioned without deviating from the unitary characteristic of the flowmeter in accordance with the embodiments of the present invention.

Figure 5:
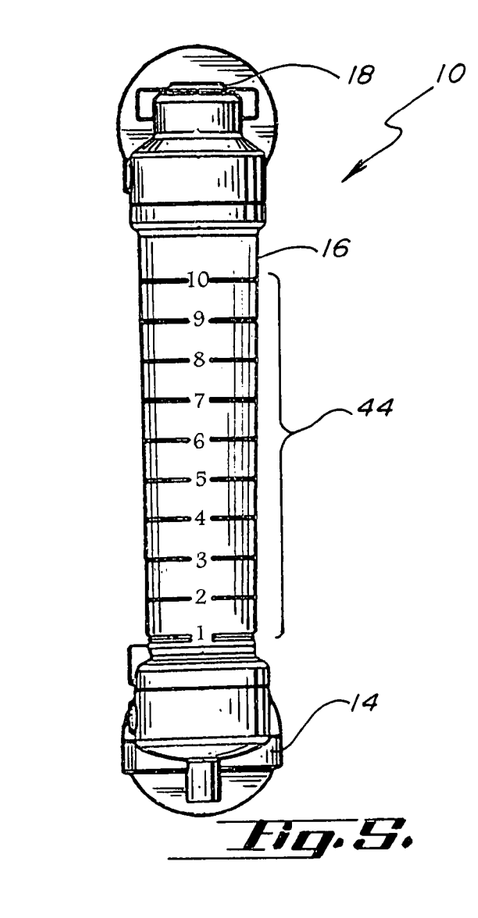
FIG. 5 is a side view of one embodiment of a valveless unitary-bodied fluoropolymer flowmeter in accordance with the present invention.
Figure 6:
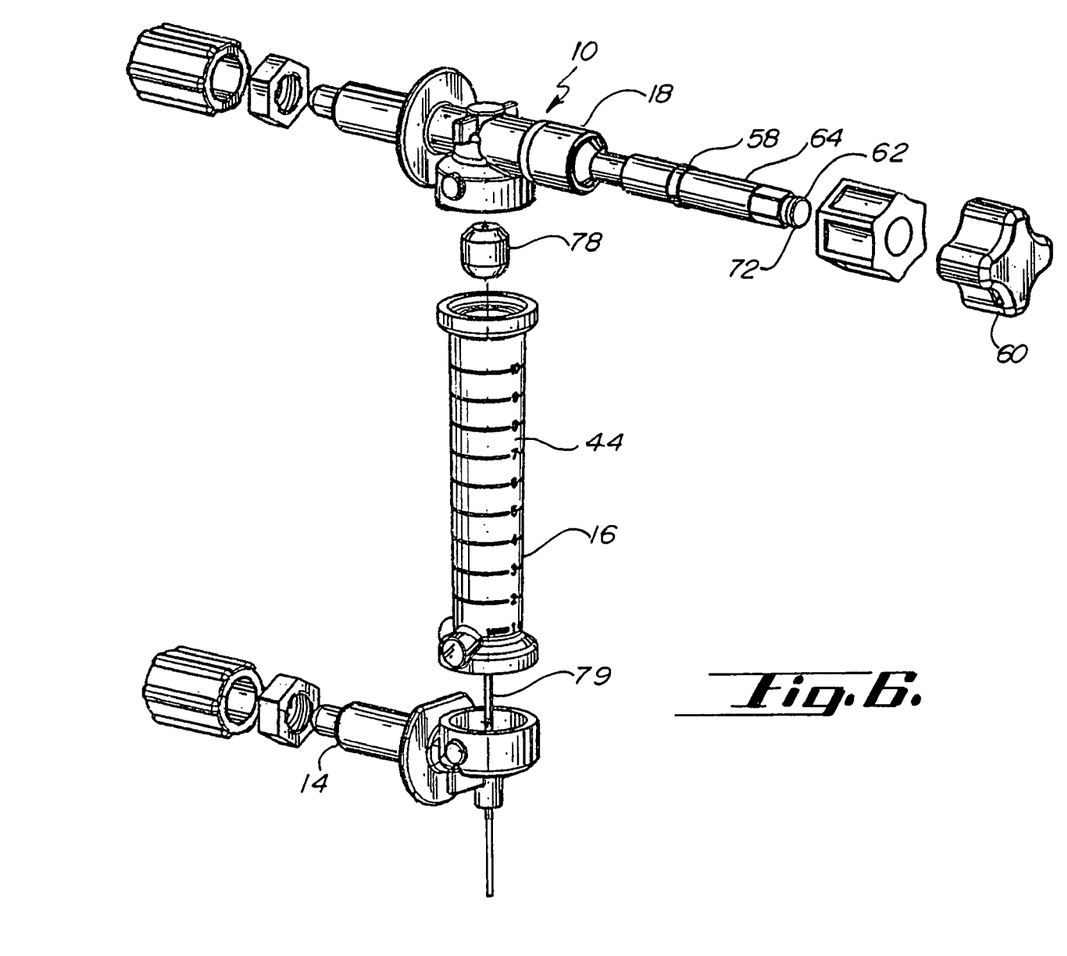
FIG. 6 is a an exploded view of one embodiment of a unitary-bodied fluoropolymer flowmeter in accordance with the present invention.

As shown in FIGS. 5–6, the outer surface of sight tube 16 can comprise flow indicia 44. This flow indicia 44 generally consists of molded or etched marks depicting specific volumetric flow rate information for use in visual gauging.

Figure 8:
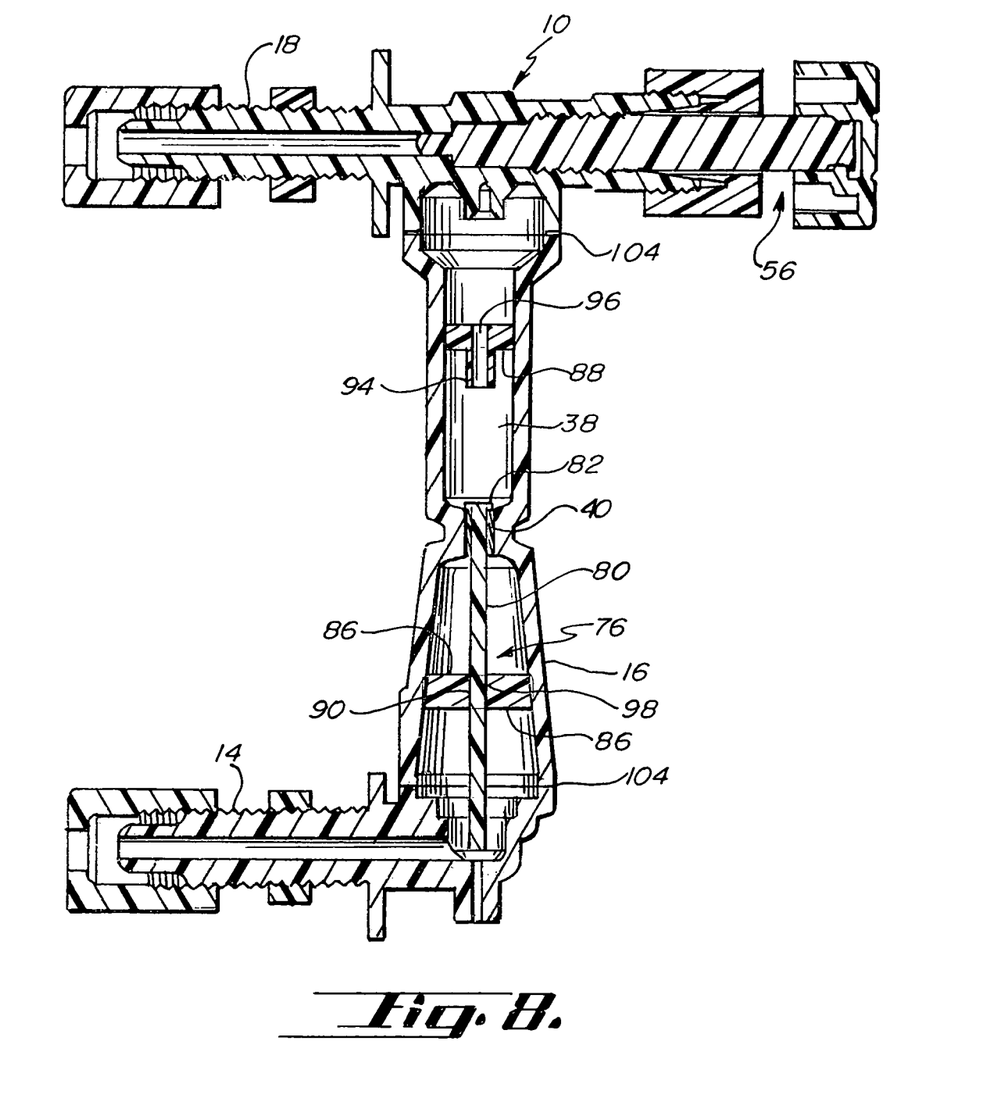
FIG. 8 is a cross-sectional view of one embodiment of a unitary-bodied fluoropolymer flowmeter in accordance with the present invention.
Figure 9:
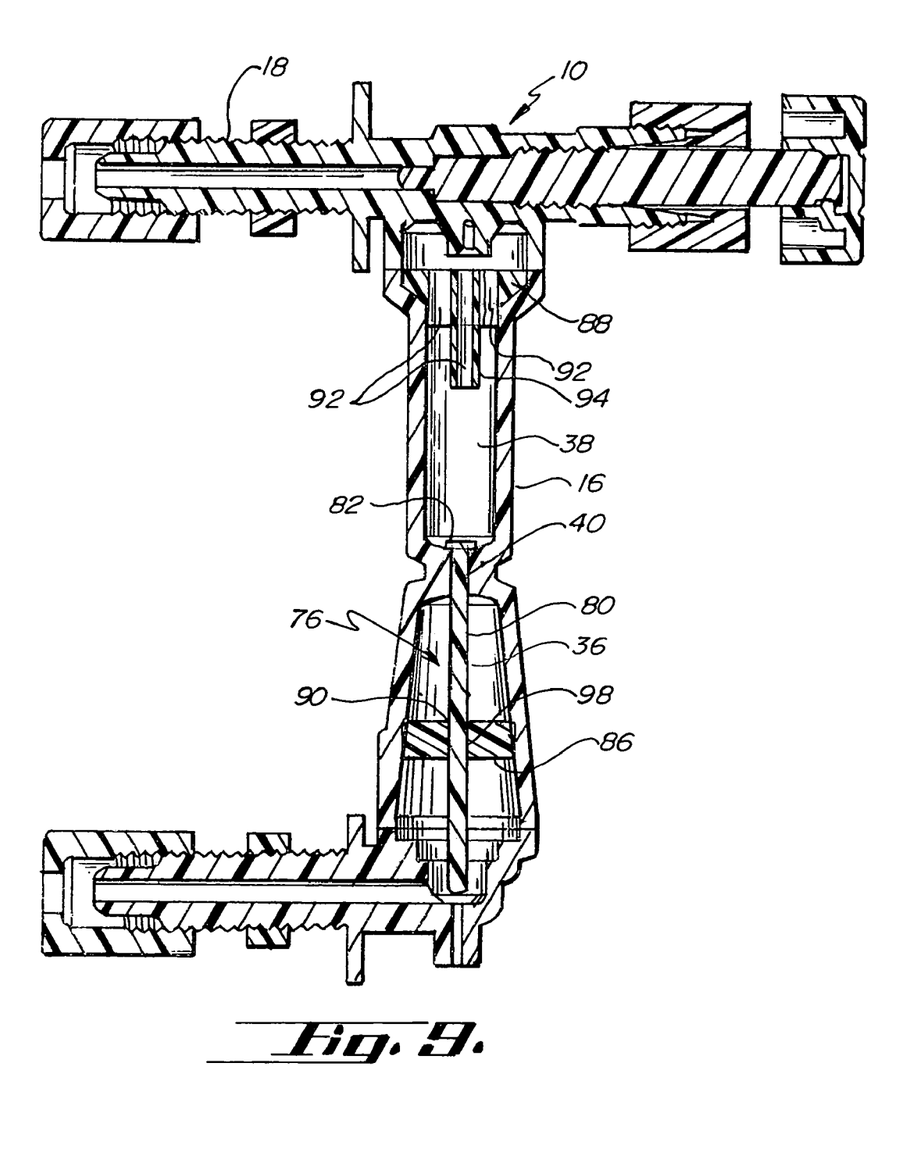
FIG. 9 is a cross-sectional view of one embodiment of a unitary-bodied fluoropolymer flowmeter in accordance with the present invention.

In another embodiment, as shown in FIGS. 7–9, sight tube 16 can comprise a generally hourglass-shaped tube with a first fitting end 30, and second fitting end 32. Sight tube 16 has a tube conduit 34 running through it to permit fluid flow communication between the first fitting 14 and the second fitting 18. The conduit 34 is generally divided into three fluid flow channels or conduits: an entry conduit 36, an exit conduit 38, and an intermediate narrowed channel 40. The portion proximate the center of the hourglass sight tube 16 and the inner tube conduit 34 defines a division between the entry conduit 36 and the exit conduit 38 and defines the intermediate narrowed channel 40. The intermediate narrowed channel 40 serves as the communication channel between the conduits 36, 38 and is some size smaller in diameter and cross-section than conduits 36, 38. Preferably, the diameter of entry conduit 36 gradually tapers such that the diameter at the portion of the conduit 36 proximate the first fitting end 30 is larger than the diameter proximate the intermediate channel 40. The diameter of the exit conduit 38 is substantially consistent along its length, with only a diameter increase or tapered effect at the end 32, 38 connectable to and in communication with the second fitting 18. Similarly, the diameter or cross-section of intermediate channel 40 is generally consistent along its entire length, but could be varied. Tube conduit 34 traverses the longitudinal axis of sight tube 16 for the entire distance of sight tube 16 through conduit/channels 36, 38, 40 such that a continuous fluid flow path is established and sight tube openings 42 are formed at each of the ends 36, 38.

Figure 10:
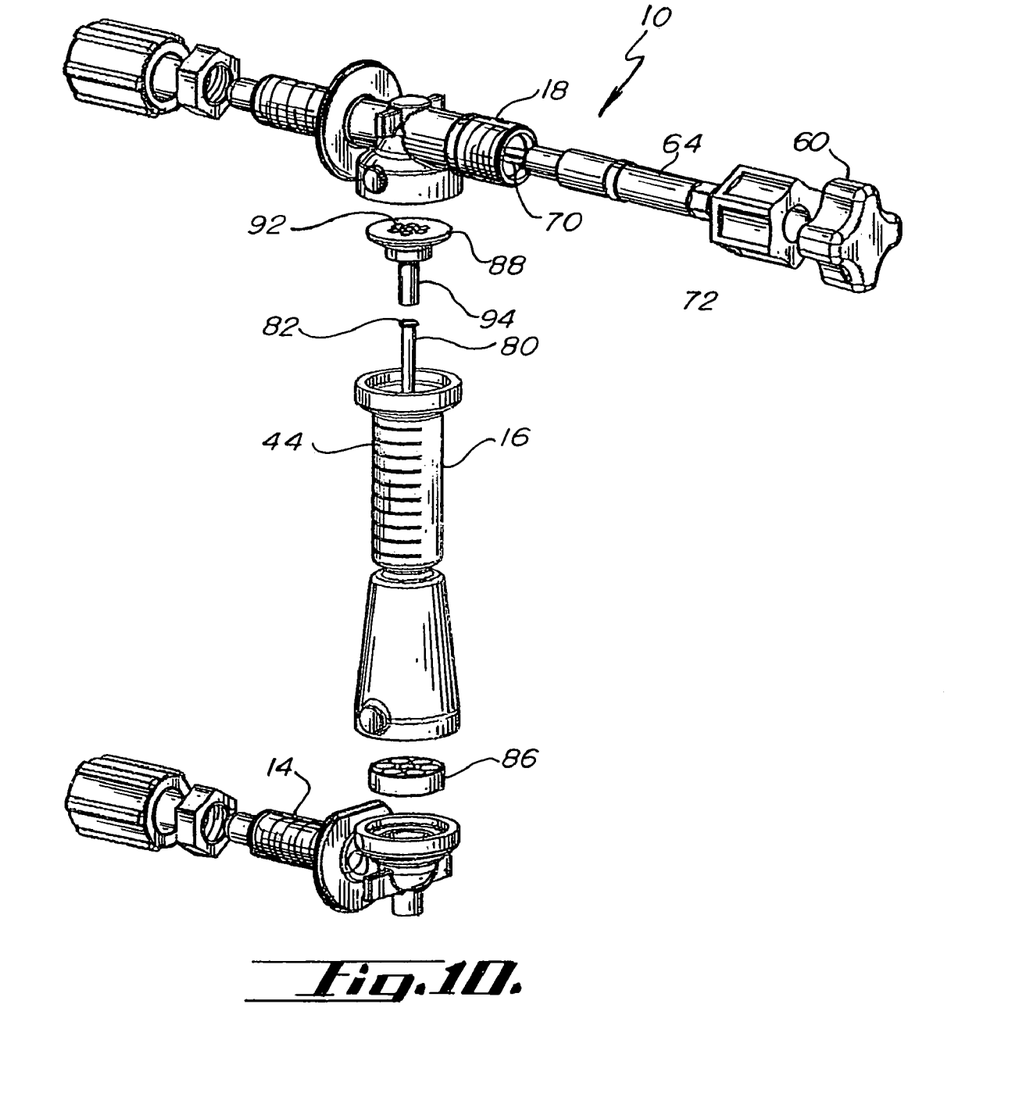
FIG. 10 is an exploded view of one embodiment of a unitary-bodied fluoropolymer flowmeter in accordance with the present invention.

As best shown in FIG. 10, the outer surface of the hour-glass shaped sight tube 16 also comprises flow indicia 44. This flow indicia 44 generally consists of molded or etched marks depicting specific volumetric flow rate information for use in visual gauging.

For each of the preferred embodiments, second fitting 18 generally takes the form of a T-shaped fitting comprising entering end 46, exiting end 48, and valve end 50. Entering end 46 is generally perpendicular to exiting end 48 and valve end 50 with exiting end 48 and valve end 50 sharing a common linear plane, with the shared linear plane intersecting the linear plane of entering end 46 so that the longitudinal axis of entering end 46 is nearly positioned at the center of the distance between the far ends 48, 50. Second fitting 18 has a second fitting conduit 52 traversing the longitudinal axis of second fitting 18 so that an inner bore of some diameter is defined. Second fitting conduit 52 traverses the entire distance of entering end 46, exiting end 48, and valve end 50 so that second fitting conduit 52 begins at entering end 46 and traverses toward the herein described plane intersection where it opens into and is one continuous shared channel with the portion of second fitting conduit 52 traversing the entire distance between exiting end 48 and valve end 50. Known fittings, connectors, and other devices known to one skilled in the art for connecting to sight tubes and other components of flowmeters are envisioned for first fitting 14. In certain embodiments, such as the flowmeters shown in FIGS. 4-5, regardless of the sight tube and float assembly configurations, the flowmeter 10 can be constructed without a valve device.

In those embodiments having a valve device, second fitting conduit 52 at valve end 50 can define valve member opening 54. Valve member opening 54 can be internally threaded some distance from valve end 50 inward toward exiting end 48. This threading is designed for receiving a threaded valve assembly 56. Such valve devices are best shown in FIGS. 3, and 6–9.

Valve assembly 56 comprises valve shaft 58, and valve top portion 60. Valve shaft 58 comprises a first end portion 62, a valve member 64, and can have a threaded portion 66. Valve top portion 60 affixes to the first end 62 via a valve aperture 68 in valve top portion 60 which traverses some longitudinal distance not equal to the entire length of the valve top portion 60. In an embodiment having external threading, threaded portion 66 is capable of threadably engaging internal threading in second fitting 18 such that the assembly 56, and particularly the valve member 64, can be adjustably moved in and out of the opening 54. Other means of moving such a valve member 64 in and out of such an opening known to one skilled in the art are also envisioned.

The valve member 64 portion can include a valve needle protrusion 70 or extension shaped for insertion in and out of compatible area of the opening 54 with the relative linear movement of the valve assembly 56. The valve needle 70 can be tapered or non-tapered, depending on the sealing performance desired, and the particular manufacturing requirements or limitations.

Generally, in those flowmeters 10 utilizing a valve assembly, valve top portion 60 is affixed to valve shaft 58 via a snapping means, as shown best in FIGS. 3, and 7–9. The snapping means comprises the valve shaft 58, valve shaft groove 72, valve top portion 60, and valve top groove 74. Valve shaft groove 72 is located distal the valve needle 70 end of the shaft 58, begins some distance inward from the end opposite to the valve needle 70 end, and travels the entire outer circumference of the shaft with the recess of valve shaft groove 72 recessed into the shaft 58 some distance. Valve top groove 74 is located at the end of valve aperture 68 and is designed to receive valve shaft groove 72 of valve shaft 58 so that the valve shaft 58 and valve top portion 60 become interlocked in a rotationally limiting manner.

Alternative embodiments can use other means of affixing valve top portion 60 to the valve shaft 58. These alternative embodiments can include fasteners such as screws or bolts. Single piece molding of valve top portion and valve shaft portion together is also an available embodiment. As stated, yet other embodiments can exclude any valve assembly at all.

Various known or inventive float assemblies can be employed with the flowmeter of the present invention. For instance, a spherical float or an elongate float and corresponding assemblies can be employed without deviating from the spirit and scope of the present invention.

For those flowmeter embodiments utilizing a spherical float 78, as shown in FIGS. 3–6, float assembly 76 is contained within sight tube 16. Such a float assembly 76 comprises spherical float 78, guide rod 79, and resting apertures 81. Spherical float 78 further comprises a float bore 83 that intersects substantially the center of float 78 and defines the receiving channel for insertion of the guide rod 79. The diameter of float bore 83 is some size larger than the outside diameter of guide rod 79. Guide rod 79 is generally a small diameter cylindrical rod with a first and second end. The outside diameter of guide rod 79 is significantly smaller than the diameter of tube conduit 34. Guide rod 79 centrally traverses the entire distance of the tube conduit 34 of sight tube 16, traversing completely through float bore 83. Guide rod 79 is rested securely in its final assembled position when the first and second ends of guide rod 79 travel into and rest within resting apertures 81. Resting apertures 81 can be located within an area inside the first fitting conduit 26 and second fitting conduit 52. The inside diameter of resting apertures 81 are some size larger than the outside diameter of guide rod 79 so that selective insertion and removal of guide rod 79 from resting apertures 81 is possible.

For those flowmeter embodiments utilizing an elongate float 80, referring primarily to FIGS. 7–10, float assembly 76 is within sight tube 16 at the completed assembly of flowmeter 10. Float assembly 76 generally comprises an elongate float 80, and at least one float guide stop 84. The float 80 preferably has a circular cross-section, but can also take on a myriad of other shapes, such as triangular, rectangular, oval, variations thereof, and the like. The elongate float 80 is preferably tapered for some length of the float 80. Generally, the float 80 is tapered such that the diameter or cross-section of the float 80 gradually increases until it reaches an integrated float flange 82. The flange can have bores, notches, or like features to enable fluid flow through a portion of the flange 82 to control the movement sensitivity of the float 80. While the flange 82 is generally cylindrical, it can take on various other shapes as well. In one embodiment the flange 82 is located at an end of the float 80, as shown in FIGS. 8-10. In another embodiment, the flange 82 is located proximate the center portion of the float 80, but can be located anywhere along the length of the float 80, as shown in FIG. 7. The outside diameter, or the cross-section, of the float 80 at the widest or largest portion is substantially smaller than that of either conduit 36, 38 but is minimally smaller than the width or cross-section of channel 40.

The float guider 84 can take the form of at least one guide 86 and/or at least one guide stop 88. The guides 86 can be rectangular, oval, circular, spherical or a myriad of other shapes. The guides 86 can include a plurality of bores to permit fluid flow, as shown in FIG. 10. The guide stops 88 are preferably of a T-shaped cross-section and can also include a plurality of guide stop bores 92 to permit fluid flow, as best shown in the cross-section view of FIG. 9. The T-shaped form is substantially defined by the extension of a guide stop protrusion 94. The stop protrusion 94 can be of varying lengths. FIG. 9 shows an embodiment implementing a relatively long stop protrusion 94. Mounting needs and locations for the guide stops 88 and a litany of other factors will influence the length. A receiving bore 96 is generally included which is some size larger than the diameter of the portion of the float 80 it is designed to receive. The receiving bore 96 generally traverses the longitudinal axis of the stop protrusion 94 to completely penetrate the guide stop 88. The diameter of the stop protrusion 94 is generally smaller than the diameter or cross-section of the flange 82 such that contact or abutment of the flange 82 against the proximate end of the stop protrusion 94 will limit the upward movement of the float 80 within exit conduit 38.

In one embodiment, as shown best in FIGS. 8-9, there are a plurality of float guiders 84 within the sight tube 16. In particular, two guides 86 having a guide bore 90 are fixed within the entry conduit 36, and a single guide stop 88, with or without a protrusion 94, is fixed within the exit conduit 38. Both guide/stops 86, 88 can be fixed at the end of the corresponding conduits 36, 38, or fixed some distance inward of the ends 30, 32. Alternatively, there can simply be one guide 86, with at least one bore shaped and located such that it is capable of receiving the float 80 and restricting lateral movement in much the same manner as if two guides were implemented. The flange 82 is preferably located at a region proximate one end of the float 80 with such an embodiment, with said end of the float 80 being greater in cross-section or diameter than the distal end. The largest diameter cross-section of the float 80 at the tapered end is still some size smaller than the diameter of channel 40 to facilitate free movement through the channel 40. The diameter or cross-section of the flange is larger than that of the proximate portion of the float 80 to limit upward movement against the stop 88, and the protrusion 94 in particular.

If there are a plurality of guides 86, then they are fixedly spaced some distance from each other such that a guide channel 98 is created. The portion of the float 80 traveling within this channel distance is small enough so that it can move freely without binding or wedging, while at the same time limiting lateral movement of the float 80 within the entry conduit 36.

In another embodiment, as best shown in FIG. 7, a single guide stop 88 is utilized and fixed within the exit conduit 38. Movement of the float 80 is significantly limited to a region within conduit 38, and thus lateral movement within conduit 36 is not a concern, and a guide 86 may not be needed. Accordingly, the flange 82 is located some distance along the float 80 away from the ends. Preferably, the flange 82 is proximate the center region of the float 80 in such an embodiment. At a lower region of the float 80, the tapering gets smaller as it moves away from the flange 82, while the cross-section of the float 80 remains substantially constant for the region approaching the opposite end or upper region above the flange 82. The tapered end below the flange 82 at its largest diameter is still some size smaller than the diameter of channel 40. The non-tapered end of the float 80 in this embodiment is generally sized smaller than the receiving bore 96 of the guide stop 88 and can be moved in and out of the bore until stopped by contact with the flange 82 against the guide stop protrusion 94.

While the elongate float 80 described herein has been described with a unitary-bodied flowmeter, the elongate float and sight tube components and configurations detailed are also envisioned for use with conventional flowmeters.

Figure 11:
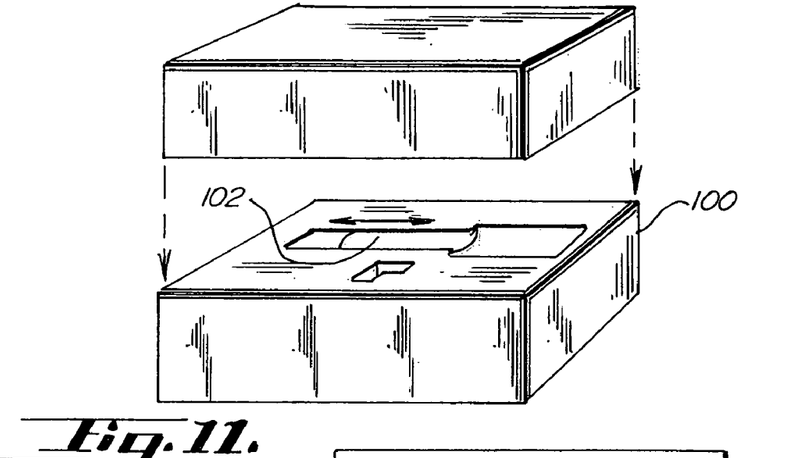
FIG. 11 is a view of a mold for injection molding fluoropolymer flowmeter components.
Figure 12:
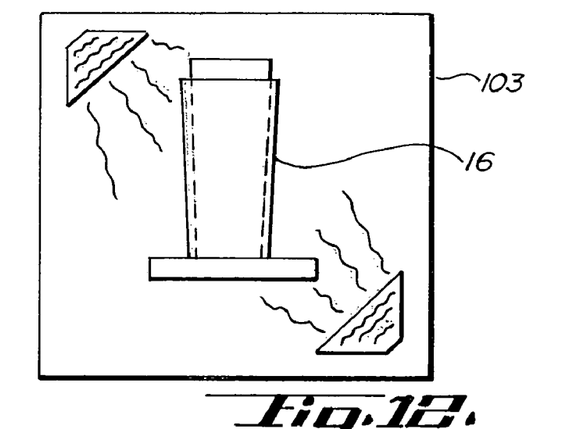
FIG. 12 is a schematic view illustrating baking an injection-molded fluoropolymer component.
Figure 13:
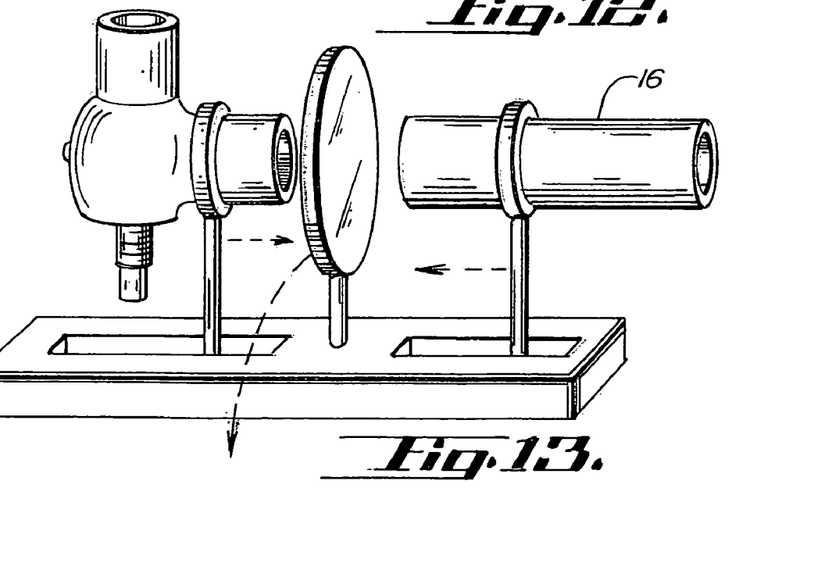
FIG. 13 illustrates an apparatus for non-contact welding fluoropolymer components.

Referring generally to the processes shown in FIGS. 11–13, a process of manufacture of one embodiment of the unitary-bodied flowmeter in accordance with the present invention involves the following steps: first, designated PFA, or similarly at least translucent fluropolymer, components used in the manufacturing of the flowmeter 10 are injection molded in a mold 100 with a retractable insert 102. This injection molding process permits the construction and shaping of thin PFA tubular components in order to achieve the desired result with regard to component translucence, which is particularly important with respect to the sight tube 16. Each of the three body components 14, 16, 18 can be molded separately to be welded as described herein, or at least two of the components can be molded as a single component to be welded with the final component.

Following the injection molding process, each designated PFA component is baked in an oven 103 at a temperature range of approximately 300° F. to 500° F., forming the PFA components into their final sizes and construction for joining to form the final unitary-bodied flowmeter 10. The PFA components can shrink substantially during the baking process. This injection molding and baking can be adjusted greatly with various jigs and other manufacturing processes and tools. As stated, various component configurations and combinations can be implemented. Further, component 14, 16, 18 shapes and sizes can be altered or re-designed while still leaving the remaining components untouched. This allows focused re-configuration to reduce manufacturing costs. For instance, if the manufacturer is desirous of changing only the configuration of the sight tube 16, such a change can be made without altering the configurations of the fittings 14, 18.

Referring to FIG. 13, once the components have been properly injection molded and baked, final joining of the components into a unitary-bodied fluoropolymer flowmeter 10 is possible. Generally, at least two of the three main body components, 14, 16, 18 are non-contact welded together creating a weldment bond 104. For instance, first fitting end 30 of sight tube 16 can be non-contact welded to exiting end 24 of first fitting 14, creating a weldment bond 100. Further, second fitting end 32 of sight tube 16 can be non-contact welded to entering end 46 of second fitting 18. Details of such non-contact welding are found in U.S. Pat. No. 4,929,293 which is incorporated herein by reference. In addition, other non-contaminating techniques and methods of bonding the fluoropolymer components known to one skilled in the art can be employed as well.

Figure 14:
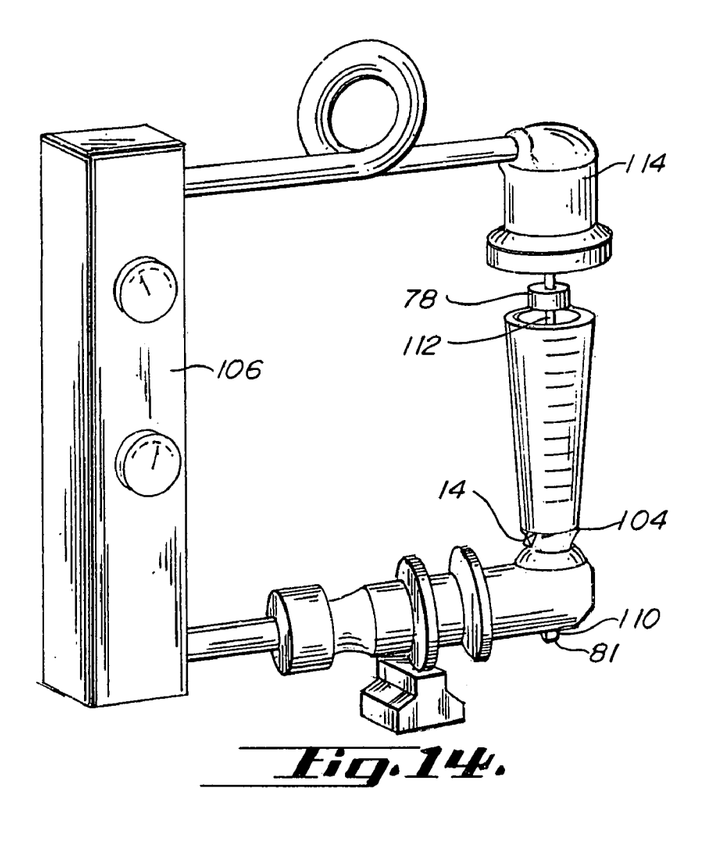
FIG. 14 is a perspective view of a fluid flow rate calibration jig.

Referring primarily to FIGS. 13–14, the non-contact welding and manufacturing process for one spherical float 78 embodiment is shown. Float assembly 76 for the spherical float 78 embodiment is calibrated prior to the joining or welding of second fitting 18 to a previously joined assembly of first fitting 14 and sight tube 16. Spherical float 78 is positioned in the juncture of first fitting 14 and sight tube 16 so that float 78 rests at the resting aperture 81 integral to first fitting conduit 26. A calibration guide rod 112 is positioned through the float into the guide rod aperture 81 of first fitting 14 so that it extends upwardly. A calibration fitting 114 engages the top opening of sight tube 16. The calibration guide rod 112 is received by the fitting 114. The calibration fitting 114 is temporarily sealingly attached to sight tube 16 and is removed upon completion of the calibration process.

Fluid, typically water, is forced into entering end 22 of first fitting 14, traveling through first fitting conduit 26 and into the tube conduit 34 of sight tube 16 where it forces float 78 up guide rod 112 some distance depending on the applied flow rate. Spherical float 78 is replaced with others of different size, shape, or weight until the desired flow readings are obtained consistent with actual flow rates provided by calibration circulator 106.

Once calibration readings are ideal, the calibration fixture 114 and guide rod 112 are removed, guide rod 79 is inserted through aperture 81 in place of the calibration guide rod 112, and aperture 81 is sealed by heating and pinching the boss 110.

Figure 15:
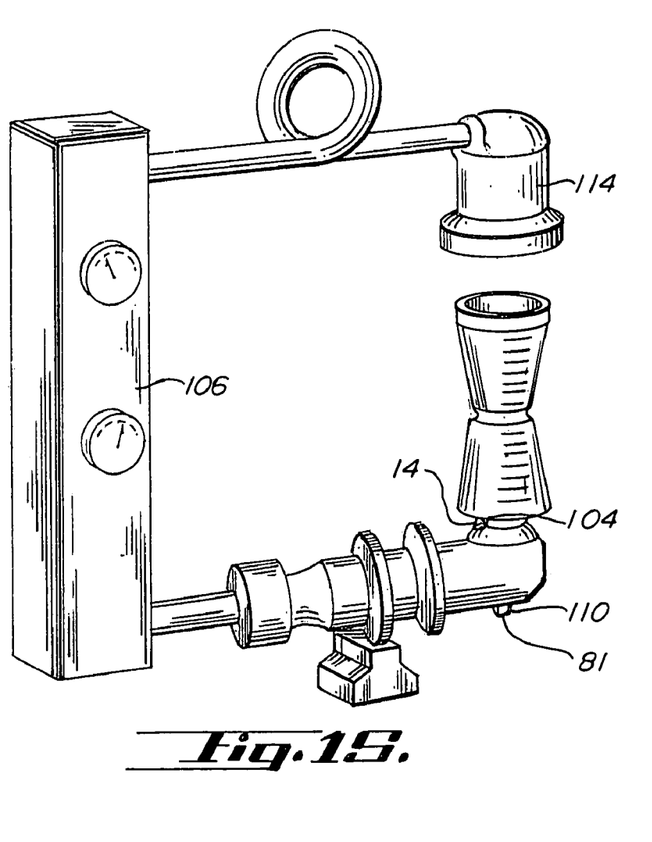
FIG. 15 is a perspective view of a fluid flow rate calibration jig.

Referring primarily to FIGS. 13 and 15, the non-contact welding and manufacturing process for an elongate float 80 embodiment is shown. Assembly 76 is generally calibrated prior to the joining of second fitting 18 to the already joined assembly of first fitting 14 and sight tube 16.

Fluid, typically water, is forced into entering end 22 of first fitting 14, traveling through first fitting 14 and into sight tube 16 where it forces float 80 up body conduit 20. Float 80 is replaced with others of different size, shape, or weight until the desired flow readings are obtained consistent with actual flow rates provided by calibration circulator 106. Various low and ultra-low rates can be easily metered with such precision calibration. Once calibration readings are ideal, the calibration fixture is removed. In addition, aperture 108 is generally sealed by heating and pinching the boss 110.

With calibration complete, on either float assembly embodiments, the next step generally consists of joining second fitting 18 and sight tube 16 by non-contact welding second fitting end 32 of sight tube 16 to entering end 48 of second fitting 18. However, as stated herein, it is envisioned that non-contact welding could be implemented to attach or bond only two of the three main body components 14, 16, 18. Completion of the assembly and calibration processes results in the final flowmeter body 12 assembly with body conduit 20 consisting of a continuous flow channel beginning with entering end 22 of first fitting 14, continuing through sight tube 16, and running through and out of exiting end 48 opening of second fitting 18.

During operation of the flowmeter 10 having a generally elongate float 80, fluid is introduced into entering end 22 of first fitting 14. As the fluid traverses through the conduit 26 into conduit 34 it puts anti-gravitational pressure on float 80, which has a gravitational bias. The vertical force of the fluid consequently moves float 80 upward closer to second fitting 18. In preferred elongate float embodiments having a flange, the flange 82 begins in an initial seat or rest position against the region where the upper portion of channel 40 and the lower portion of conduit 38 join. In this initial seated position, the flange 82 substantially closes off fluid communication through channel 40, and thus measurably restricts fluid from entering into conduit 38 from conduit 36. In conventional flowmeter float designs, a relatively significant amount of vertical fluid force is needed to counter the gravitational bias of the float. In the present invention, however, the fluid flow required to move the float 80 is significantly reduced. This is possible because of the initial closed position of the flange 82 against the channel 40 and the narrowing distance provided by the narrow channel 40. Fluid force builds up rather easily behind the flange 82 since there is substantially no room between the float 80 and the proximate walls of the channel 40. This reduced fluid travel space coupled with the inability of the fluid to travel past the blockage created by the flange 82 creates a highly sensitive configuration where fluid metering of low fluid flow is possible. Fluid pressure behind the flange 82 and channel 40 is easily created despite low or ultra low fluid flows.

As the low flowing fluid builds up within the channel 40 and against the flange 82, the float 80 will move correspondingly. Because of the relative narrowness of the channel 40, and the reduced size of conduit 38 in comparison to conduit 36, fluid pressure on the float 80 will continue despite consistent low or ultra-low fluid flow rates within the body conduit 20 even after the flange 82 has moved some distance upward beyond its initial seated position against the opening of channel 40. Once the vertical force of the fluid is equal to that of the gravitational bias of float 80, vertical movement will stabilize. If not, movement of the float 80 upward will continue until the flange 82 abuts the guide stop 88, or protrusion 94. The distance between the flange 82 in its resting position, and the protrusion 94 can be adjusted by altering the length of the conduit 38, adjusting the length of the protrusion 94, the fixed location of the guide stop 88, and like techniques and configurations. Indications of the fluid flow rates can be measured by metering a portion of the float 80 against the marked or etched indicia 44 on the sight tube 16. Preferably, flow rates can be measured according to the alignment of the flange 82 in relationship to the indicia 44. Needed adjustments to fluid flow rates can be made based on the obtained flow readings.

During operation of the flowmeter 10 employing a generally spherical float 78, fluid is introduced into entering end 22 of first fitting 14. As the fluid traverses through the body conduit 20 into tube conduit 34 it puts and anti-gravitational pressure on float 78 which has a gravitational bias. The vertical force of the fluid consequently moves float 78 along guide rod 79, moving float 78 closer to second fitting 18. Once the vertical force of the fluid is equal to that of the gravitational bias of float 78, vertical movement will stabilize. Flow rate readings during this stabilization period can be made according to flow indicia 44. Needed adjustments to fluid flow rates can be made based on the obtained flow readings.

Although the invention hereof has been described by way of example of preferred embodiment, it will be evident that other adaptations and modifications may be employed without departing from the spirit and scope thereof. The terms and expressions employed herein have been used as terms of description and not of limitation; there is no intent of excluding equivalents and it is intended that the description cover any and all equivalents that may be employed without departing from the spirit and scope of the invention.

What is claimed is:

1. A method for manufacturing a translucent flouropolymer flowmeter, comprising the steps of:

injection molding a plurality of components from a molten fluoropolymer plastic having translucent properties, with at least two of the components having substantially matable tubular end portions with one of the components being a sight tube;

heating the tubular end portions of the at least two components with a heater spaced from the tubular end portions such that the heater does not directly contact the tubular end portions;

joining the mateable tubular end portions of the at least two components while the tubular end portions are partially molten; and retaining the joined tubular end portions until the tubular end portions are substantially non-molten, thereby bonding the at least two components by a weldment bond together into a unitary component.

2. The method of claim 1, wherein baking at a high temperature of the at least two components follows the injection molding.

3. The method of claim 1, wherein the step of injection molding the plurality of translucent fluoropolymer components comprises the step of molding the sight tube, a first fitting, and a second fitting into a unitary body.

* * * * *